(12) United States Patent
Kishimoto et al.

(10) Patent No.: US 7,999,732 B2
(45) Date of Patent: *Aug. 16, 2011

(54) METHOD AND SYSTEM FOR GPS POSITION MEASURING AND FREQUENCY ERROR DETECTING METHOD

(76) Inventors: Nobuhiro Kishimoto, Osaka (JP); Seiichiro Hirata, Nagaokakyo (JP)

( * ) Notice: Subject to any disclaimer, the term of this patent is extended or adjusted under 35 U.S.C. 154(b) by 336 days.

This patent is subject to a terminal disclaimer.

(21) Appl. No.: 12/289,575

(22) Filed: Oct. 30, 2008

(65) Prior Publication Data

US 2009/0066566 A1    Mar. 12, 2009

Related U.S. Application Data

(62) Division of application No. 11/797,139, filed on May 1, 2007, now Pat. No. 7,528,771.

(51) Int. Cl.
*G01S 19/23* (2010.01)
*G01S 19/09* (2010.01)

(52) U.S. Cl. .............................. 342/357.62; 342/357.46

(58) Field of Classification Search .................. 342/145, 342/200, 357.23, 357.25, 357.44, 357.46, 342/357.62; 701/213, 215
See application file for complete search history.

(56) References Cited

U.S. PATENT DOCUMENTS

| 7,528,771 B2 * | 5/2009 | Kishimoto et al. ...... 342/357.62 |
| 2003/0128158 A1 | 7/2003 | Jandrell .................... 342/357.12 |
| 2003/0201935 A1 | 10/2003 | King et al. ............... 342/357.15 |
| 2005/0162306 A1 | 7/2005 | Babitch et al. ........... 342/357.05 |

FOREIGN PATENT DOCUMENTS

JP    7-321644    12/1995

* cited by examiner

*Primary Examiner* — Dao L Phan
(74) *Attorney, Agent, or Firm* — Kratz, Quintos & Hanson, LLP (57) ABSTRACT

A receiver terminal receives a frequency from an external reference oscillator portion, which is more accurate than that of a frequency generated within the receiver in a local oscillator portion. The frequency from the local oscillator portion is measured using the external frequency as the reference, which determines the error in the local oscillator frequency relative to the external reference and permits the local oscillator frequency to be corrected to within the error of the external oscillator frequency. A plurality of candidate values for the remaining local frequency error are selected within a predetermined frequency range to include any remaining error of the local oscillator frequency. The received signal from a satellite is correlated with a matching pseudorandom code to detect the signal and measure the signal delay and Doppler shift of the signal relative to the corrected local oscillator frequency. The delay value is used to obtain a pseudorange measurement and the measured Doppler shift permits further correction to the local oscillator frequency, thus reducing the frequency search range for the remaining satellites.

3 Claims, 10 Drawing Sheets

METHOD AND SYSTEM FOR GPS POSITION MEASURING AND FREQUENCY ERROR DETECTING METHOD

This application is a divisional application of prior application Ser. No. 11/797,139 filed on May 1, 2007 now U.S. Pat. No. 7,528,771.

BACKGROUND OF THE INVENTION

1. Field of the Invention

This invention relates to a method and system for GPS position measuring and a frequency error detecting method.

2. Description of Related Art

In a receiver using satellites for position measuring (GPS for example), pseudorandom codes received from the satellite are detected and synchronized (i.e., aligned with) with the same codes generated within the receiver.

However, because the satellites are moving, the signals have a Doppler shift and the frequency of a received signal is different from the frequency transmitted from the satellite. In order to detect the received signal, the receiver must search not only for the proper code alignment, but also must locate the Doppler-shifted frequency of the received signal and compensate for the Doppler shift so that correlation processing can extract the signal from the noise.

When the internal oscillator in the receiver has an unknown frequency error, this error is added to the Doppler shift of the signal caused by satellite motion.

In order for the receiver to compensate for the Doppler shift by itself, it must look for the received signal at many frequencies which span the expected range of Doppler shift plus the range of error in the receiver local oscillator frequency. A large amount of correlation processing is required at each frequency in this range to make the signal visible. Thus, there is a significant disadvantage in that considerable time is consumed until the receiver can synchronize its pseudorandom code and compensate for the Doppler shift on the signal.

Even if the approximate Doppler shift of the satellites is provided by an outside source, the frequency uncertainty in the receiver's local oscillator can still mandate an extensive search for the received signal over a large frequency range. A very accurate oscillator can solve this problem. However, only an expensive oscillator, such as a rubidium oscillator, can provide the required frequency accuracy.

To overcome the disadvantage of a time-consuming frequency search, the standard practice is to synchronize the receiver's local oscillator with received signals having an accurate frequency. This is typically done by locking the phase of the receiver's local oscillator to that of the received accurate frequency signal (such as is done in clocks which receive signals from the atomic standard radio station JJY). This means is generally known as a phase-locked loop (PLL) circuit (refer to the Japanese Patent Provisional Publication No. H7-321644, for example).

This conventional method has the disadvantage that detecting the error of the receiver's local oscillator by reference to an outside signal is extremely difficult when the outside signal is influenced by Doppler shift or is embedded in noise.

It is therefore the object of the present invention to provide a GPS position measuring method and system, and a frequency error detecting method in which the signal-to-noise (SNR) ratio of a very weak signal covered by noise is significantly improved, the frequency error in the receiver's local oscillator can be self-detected, and the processing time of the detection can be made short.

BRIEF DESCRIPTION OF THE DRAWINGS

The present invention will be described with reference to the accompanying drawings in which.

DESCRIPTION OF THE PREFERRED EMBODIMENTS

Preferred embodiments of the present invention will now be described with reference to the accompanying drawings.

In a first embodiment shown in FIGS. 1 through 8, FIG. 1 is an overall block diagram of a GPS position measuring method and a GPS measuring system of the present invention.

Figure 1:
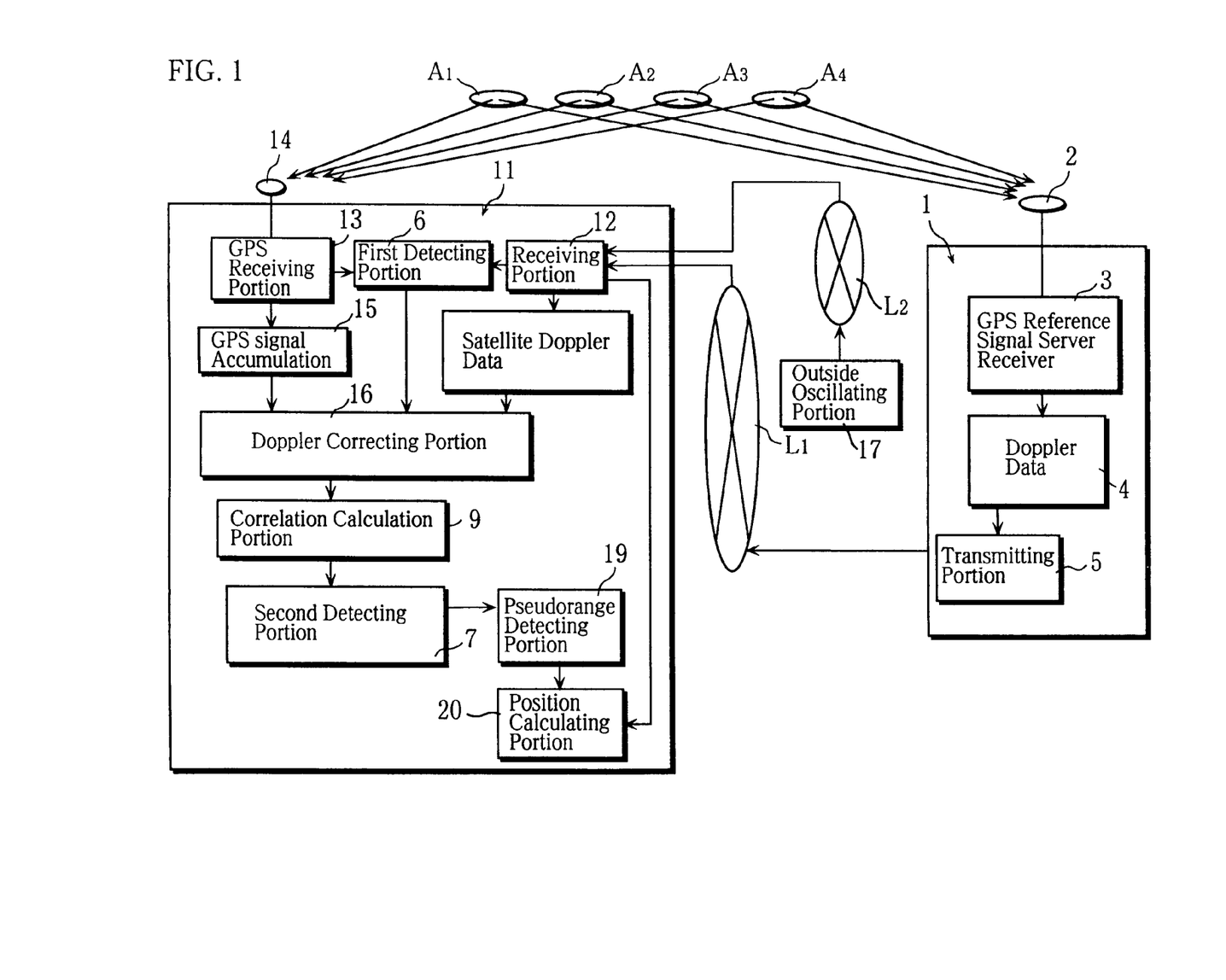
FIG. 1 is an overall block diagram showing an outline of a first embodiment of the present invention.

In FIG. 1, symbols $A_1$, $A_2$, $A_3$, and $A_4$ identify satellites used for position measuring, collectively referred to by the symbol A. A base station 1 sends to a receiver terminal 11 measurements of signal Doppler shift from each satellite as measured at the base station location. Since the base station can measure frequency very accurately, the measured Doppler shifts are almost entirely due to satellite motion, and represent frequency errors relative to the frequencies actually transmitted by the satellites.

The base station 1, provided with a receiving antenna 2 placed in a clear area with direct view of the satellites, receives the GPS signals with a server receiver 3, and extracts the frequency errors due to Doppler from the GPS signal by means of computations performed in Doppler Data Portion 4.

A transmitter 5 located in the base station transmits the data from Doppler Data Portion 4 to the receiver terminal 11 through a communication link $L_1$.

An external reference oscillator 17 is provided which has a frequency that is more accurate than the local oscillator in the receiver terminal 11. The frequency of the external oscillator 17 is transmitted to the receiver 12 of the receiver terminal through communication link $L_2$.

The communication links $L_1$ and $L_2$ may be any possible communication links including electromagnetic communication means such as ground broadcast, mobile phone communication, information broadcasting using communication satellites, and internet links.

It is common for many receiver terminals 11 to have several functions, including the capability of receiving information from many sources (mobile phone, the internet, etc.). To keep the explanations simple, one receiver terminal 11 is shown in FIG. 1, and functions not related to the present invention are excluded.

The receiver terminal 11 is provided with an antenna 14 for receiving GPS signals. The terminal 11 and the antenna 14 may be located in areas with good GPS signal reception, but could also be located where the GPS signal is weak, such as under heavy foliage, in urban canyons, or inside buildings.

Antenna 14 is connected to a GPS receiver 13 which amplifies the GPS signals, converts them to baseband (i.e., removes the carrier component of the signal), and employs an analog-to-digital converter (ADC) to convert the signals to digital form. Receiver 13 also contains a local oscillator 34 (shown in FIG. 2). The digitized signal is stored in random-access memory (RAM) located in the GPS Signal Accumulation Portion 15. The First Detecting Portion 6 measures the frequency error of local oscillator 34 by comparing it with the external reference frequency received by receiver 12 and sending the measured error to the Doppler Correcting Portion 16. Doppler Correcting Portion 16 conducts Doppler correction of the signals which have been stored in the GPS Signal Accumulation Portion 15 by using candidate frequency values based on the corrected frequency of local oscillator 34 and the Doppler measurements received from the base station 1. The candidate frequency values span the expected range of received signal Doppler shifts at receiver terminal 11.

Receiver terminal 11 is provided with a Correlation Calculation Portion 9 to perform a correlation calculation on the signals processed by the Doppler Correcting Portion 16. The correlation calculation produces a correlation function which has a discernible peak when the candidate frequency value is the same as that of the received signal. The location of the peak also indicates the delay in the signal arrival. A Second Detecting Portion 7 uses the result of the correlation to detect accurate local frequency error, and a Pseudorange Detecting Portion 19 uses the correlation result to obtain pseudorange. Finally, the position of the receiver terminal 11 is computed from the pseudorange data by Position Calculating Portion 20.

Figure 3:
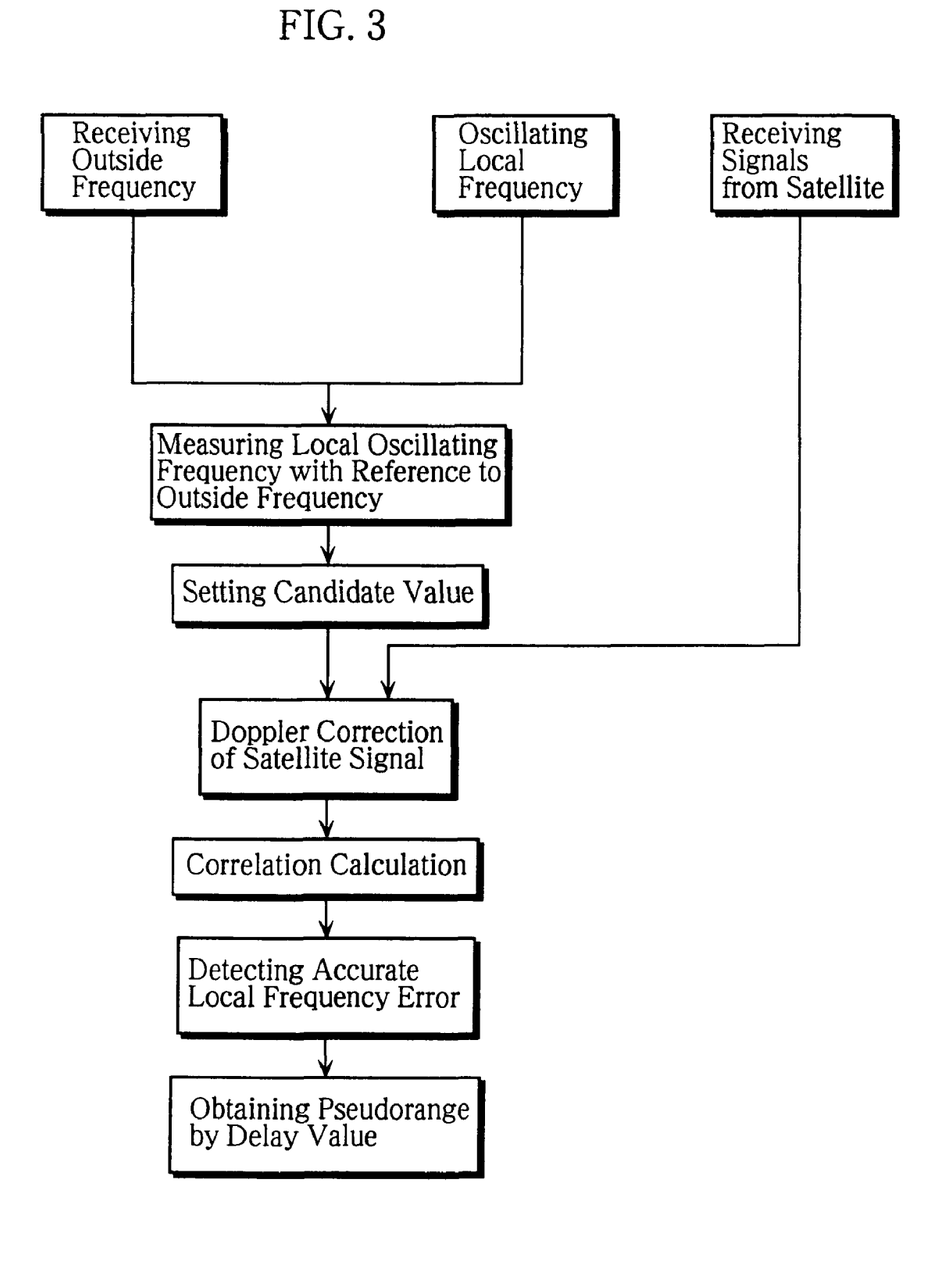
FIG. 3 is a flowchart showing the basic operations including reception of the satellite signals, local oscillator frequency correction, and obtaining pseudorange measurements.

FIG. 3 is a flowchart depicting the operations, starting with the receipt at receiver terminal 11 of signals from the satellites A and the frequency from external oscillator 17 to the determination of pseudoranges.

The GPS position measuring method of the present invention is described with reference to FIG. 1 and FIG. 3.

The First Detection Portion 6 measures the frequency of the local oscillator 34 (shown in FIG. 2) referenced to the frequency of the external oscillator 17, which is more accurate than the local frequency. The error of the local oscillator frequency is thereby determined. Next, a plurality of candidate values for the error of the local oscillation frequency are determined within a predetermined frequency range including the error of the local oscillator frequency, and are input to the Doppler Correcting Portion 16. Then, Doppler correction of the satellite signal received by antenna 14 is conducted by the Doppler Correcting Portion 16. The goal is to find which candidate frequency value will compensate the Doppler-shifted received frequency from a satellite. The appropriate candidate frequency is found by the Correlation Calculation Portion 9 when the correlation function with the largest peak is found. The results of the correlation calculation are then used by the Second Detecting Portion 7 to obtain the accurate local frequency error, and are also used by the Pseudorange Detecting Portion 19 to obtain the signal delay τ and convert it into pseudorange. The position of the receiver terminal 11 is then calculated by the position calculating Portion 20 using the pseudoranges to the satellites A, the position of the base station as received by Receiving Portion 12, the positions of the satellites, and pseudoranges to the satellites A collected by the base station.

Figure 2:
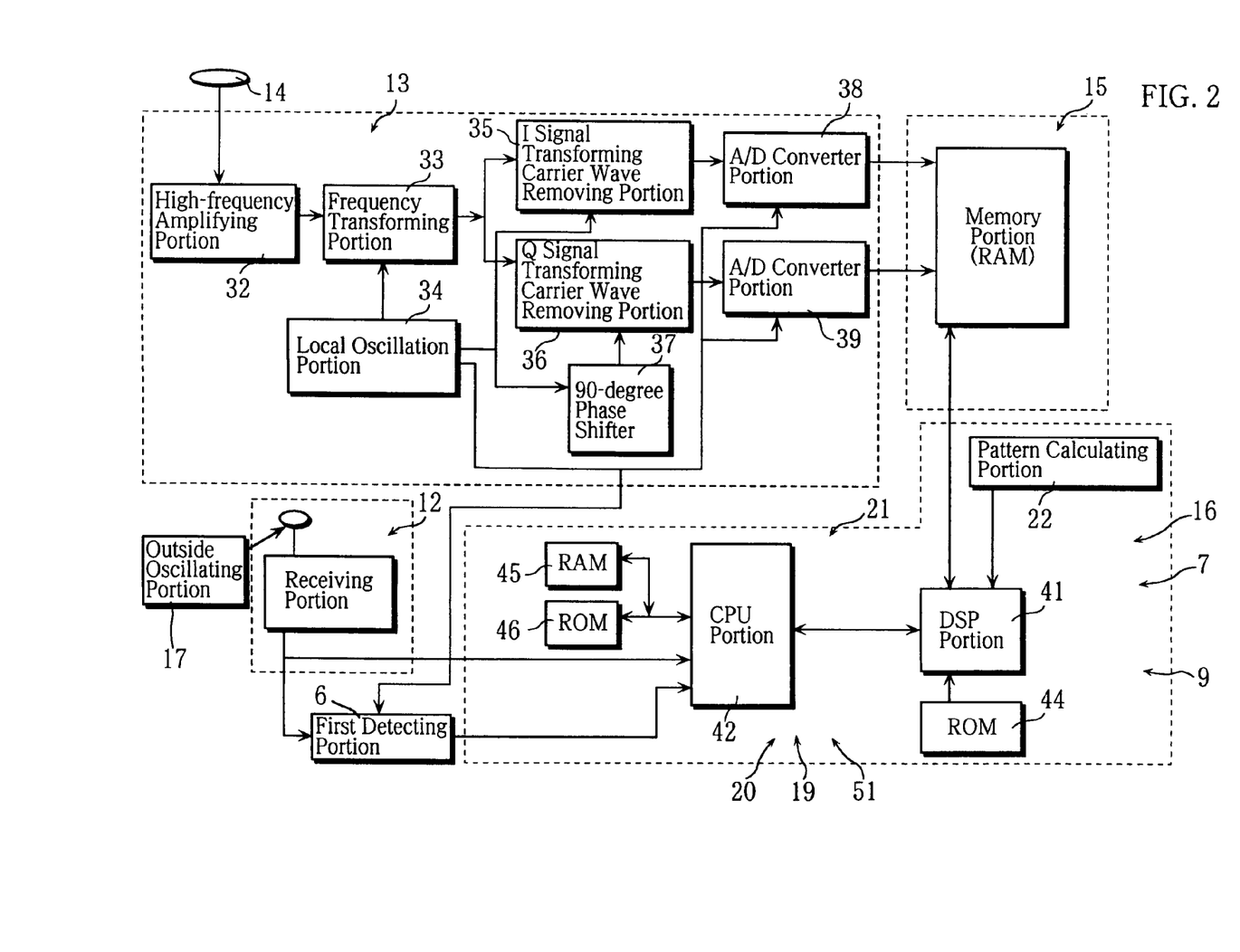
FIG. 2 is a block diagram showing the composition of a receiver terminal.
Figure 4:
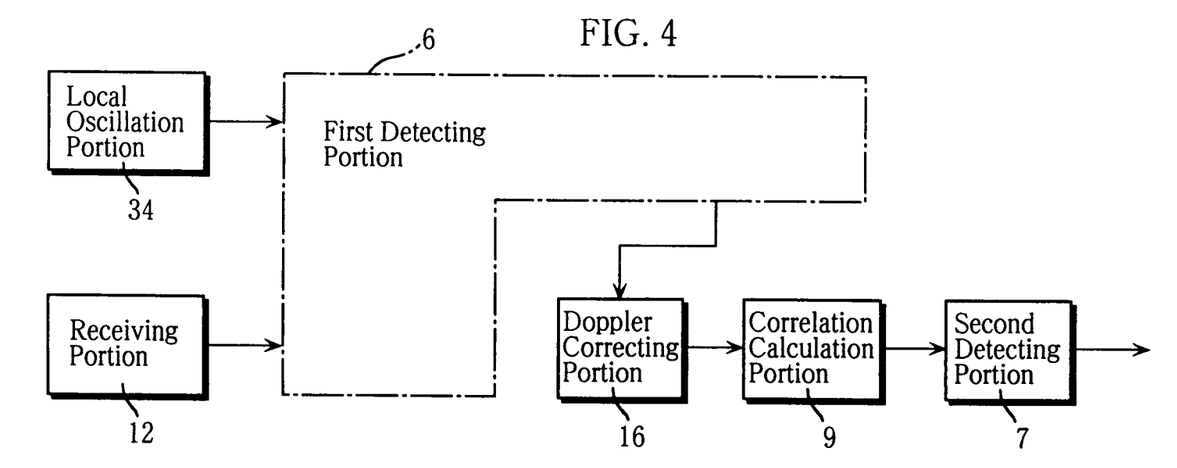
FIG. 4 is an explanatory diagram of important functions in the receiver terminal.

FIG. 2 and FIG. 4 are block diagrams showing the composition of the receiver terminal 11. Functions within various processing portions in these figures will now be described in detail.

Figure 4A:
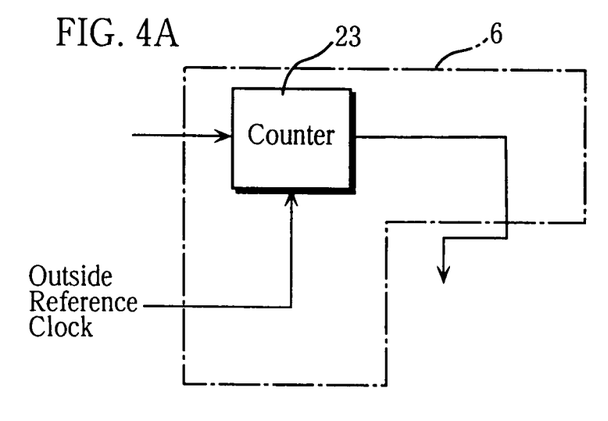
FIG. 4A is a diagram showing a method of local oscillator frequency error measurement using a counter.
Figure 4B:
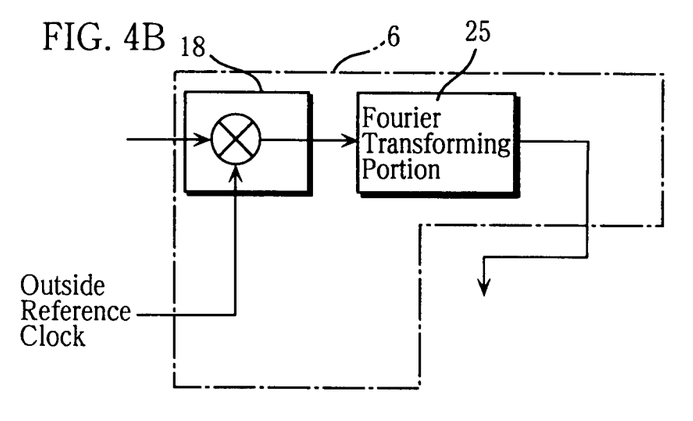
FIG. 4B is a diagram showing an alternate method of local oscillator frequency error measurement using a Fourier Transform.

The First Detecting Portion 6 in FIG. 4 may have the embodiments shown in FIGS. 4A and 4B. In the embodiment of FIG. 4A the First Detecting Portion 6 is provided with a counter 23 to count the frequency of the local oscillator using as a reference an external frequency which is more accurate than the local oscillator frequency. The local oscillator 34 can be an economical crystal oscillator or a frequency synthesizer controlled by such a crystal oscillator. Counter 23 counts the cycles of the local oscillator during a predetermined time interval (1 second, for example) which is derived from the external frequency reference.

The frequency error of the local oscillator measured by counter 23 is calculated as follows: Error=(measured value of the local oscillator frequency)−(local oscillator designed frequency). This error includes whatever error exists in the external frequency reference, which is usually small.

When the Local Oscillator Portion 34 contains a phase-lock loop (PLL) circuit with frequency dividers which reduce the output frequency of Local Oscillator Portion 34 by a factor of N, it may be convenient for counter 23 to count the reduced frequency instead of the output frequency. In either case the frequency error of the local oscillator output can easily be determined.

FIG. 4B depicts an alternative embodiment for measuring the local oscillator frequency error. In this embodiment the local oscillator frequency is down-converted by the external reference frequency. The down-converted frequency is then measured by a Fourier Transforming Portion 25.

Referring to FIG. 2, the local oscillator frequency error detected by the First Detecting Portion 6 is transmitted to a Candidate Value Setting Portion 51 in the receiver terminal 11, and a search frequency range is determined. The center of the range is the measured local oscillator frequency error and its width is twice the magnitude of the largest possible error in the external reference frequency. The Candidate Value Setting Portion 51 also selects a plurality of candidate frequency values within this range.

The method of setting the candidate frequency values will now be concretely described. If the local oscillator frequency error is calculated to be 2000 Hz by the First Detecting Portion 6 and the maximum error of the external reference is 100 Hz, the accurate local oscillator frequency error exists within a frequency range from 2000−100=1900 Hz to 2000+100=2100 Hz. Within this range from 1900 Hz to 2100 Hz, candidate values for the accurate local oscillator frequency error might be placed at multiples of 10 Hz away from the center of the range (2000 Hz). In this case the candidate values would be 1900 Hz, 1910 Hz, 1920 Hz, ..., 2080 Hz, 2090 Hz, and 2100 Hz. The actual spacing used for the candidate values could be different, depending on several factors. For example, the spacing could be set to correspond to the number of parallel units in the Doppler Correcting Portion 16.

Figure 5:
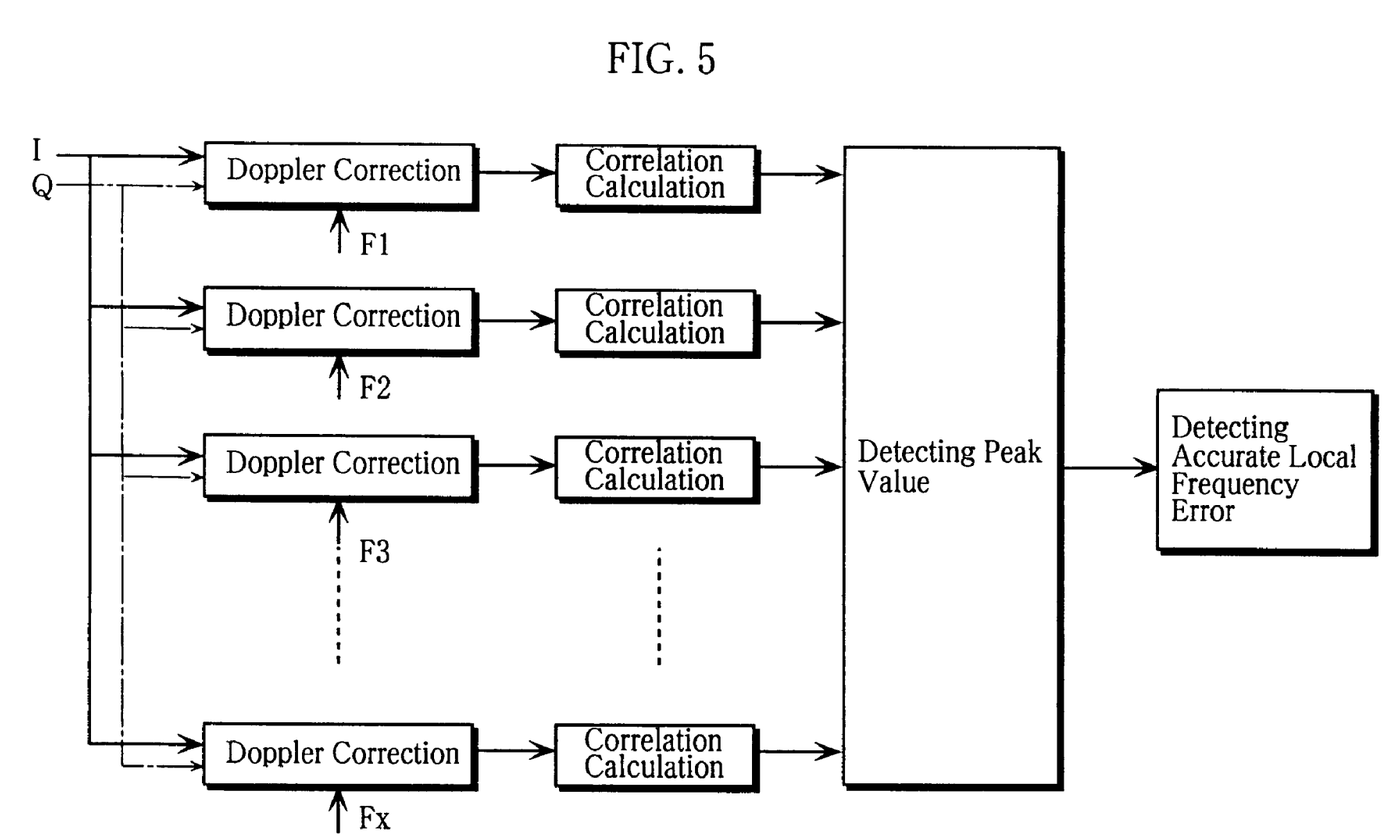
FIG. 5 is an explanatory diagram showing how remaining error in the local oscillator frequency is detected by processing the received satellite signals.

A plurality of parallel units is provided in the Doppler Correcting Portion 16 (see FIG. 5). There are 21 units In the embodiment currently described, but a different number can be employed. The plurality of candidate frequency values are input to the Doppler Correcting Portion 16. Also, the signal obtained from an I Signal Transforming Portion 35 and a Q Signal Transforming Portion 36 shown in FIG. 2 are input to Doppler Correcting Portion 16.

The process in which the satellite signal is received, processed by the I Signal Transforming Portion 35 and the Q Signal Transforming Portion 36, and input to the Doppler Correcting Portion 16 is now described.

Referring to FIG. 2, the GPS Receiving Portion 13 is provided with a High-Frequency Amplifying Portion 32 which receives the signal from the antenna 14, a Frequency Transforming Portion 33 to down-convert the signal frequency, the I Signal Transforming Portion 35 and Q Signal Transforming Portion 36 (both of which remove the carrier component of the signal), a 90-degree phase shifter 37, A/D converters 38 and 39, and a RAM memory 15 to temporarily store the signal.

Figure 6:
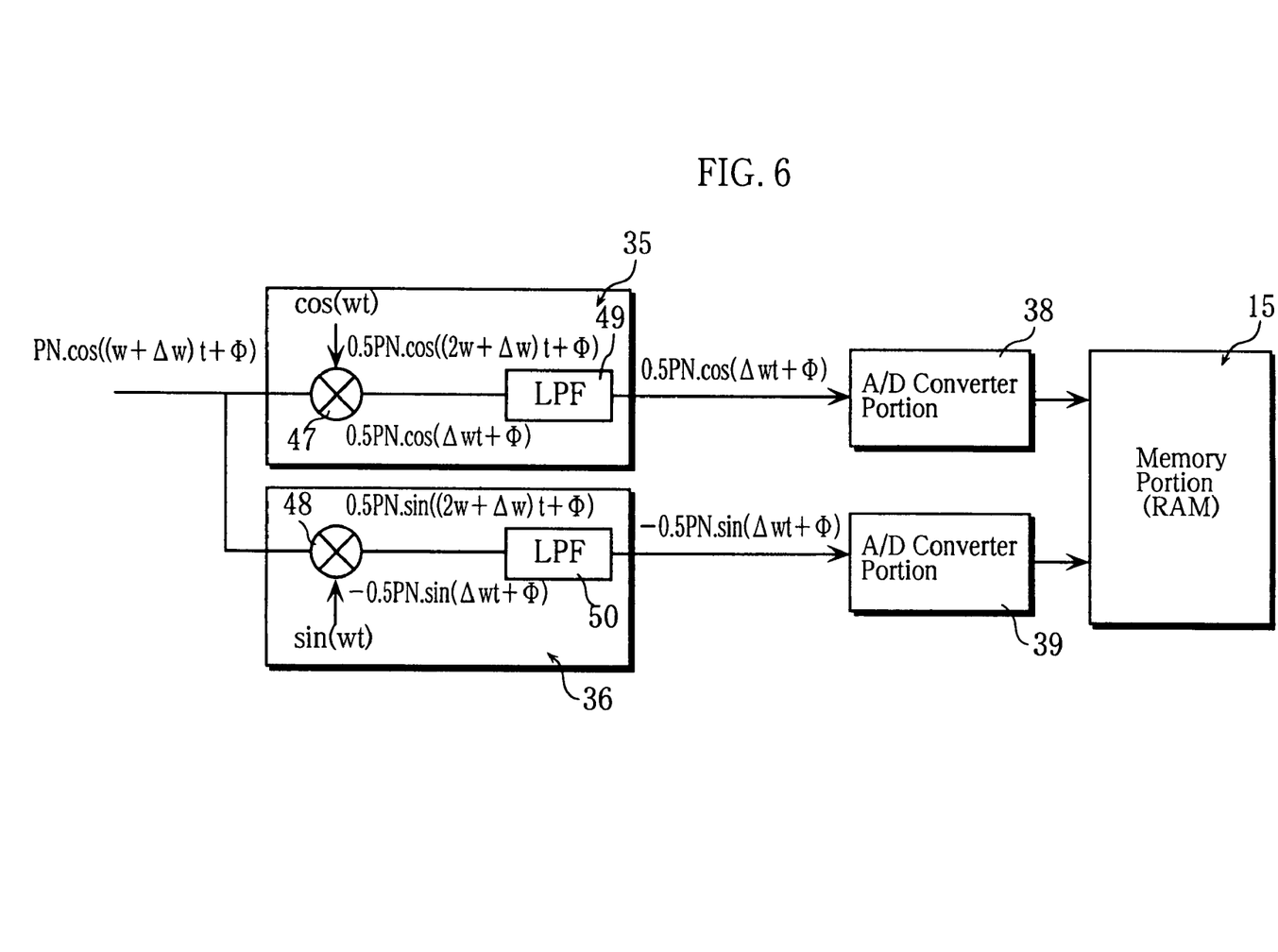
FIG. 6 is an explanatory diagram showing how the received signal is transformed into in-phase (I) and quadrature (Q) components of an I-Q signal.

FIG. 6 shows the mathematical operations performed by the I Signal Transforming Portion 35 and the Q Signal Transforming Portion 36 in which baseband (carrier removed) I and Q signals are obtained from the signal produced by the Frequency Transforming Portion 33. The production of the baseband signal is achieved by multipliers 47 and 48 and lowpass filters 49 and 50.

Referring to FIGS. 2 and 6, the GPS 1575.42 MHz spread-spectrum signal containing a PN C/A code unique to each satellite is conveyed from the antenna 14 to the High-Frequency Amplifying Portion 32. The PN-modulated signal is down-converted to an intermediate frequency (IF) by the Local Oscillator Portion 34, which may be a frequency synthesizer, and the Frequency Transforming Portion 33. The IF may be chosen to be any of various frequencies, for example, 70 MHz. For concreteness, 70 MHz will be used in the following description.

The baseband signal is produced by multiplying the 70 MHz IF carrier by two sinusoidal waveforms which differ by 90 degrees. One of the waveforms comes directly from the Local Oscillator Portion 34, and the other is produced by passing this waveform through a 90-degree phase shifter 37.

FIG. 6 shows the details of generating the baseband signal. The GPS signal, down-converted to the 70 MHz IF signal, is expressed by $PN \cdot \cos((w+\Delta w)t+\phi)$, where PN is the pseudo-random code waveform, w is the 70 MHz carrier, $\Delta w$ is the Doppler frequency shift, and $\phi$ is the signal phase. The Doppler frequency shift $\Delta w$ is the combined effect of the Doppler frequency shift of the satellite signal captured by antenna 14 and the frequency error of the Local Oscillator Portion 34. Thus, $\Delta w$ can be expressed as $\Delta w = \Delta w_c + \Delta w_L$, where $\Delta w_c$ is the Doppler shift of the satellite signal and AWL is the frequency error of the Local Oscillator Portion 34.

The waveform from the Local Oscillator Portion 34 in FIG. 2 and the waveform emerging from the 90 degree phase shifter 37 are respectively expressed by $\cos(wt)$ and $\sin(wt)$, and are orthogonal to each other. The frequency w of these waveforms is the same as the designed IF frequency (without Doppler shift) produced by the Frequency Transforming Portion 33. In FIG. 6 each of these waveforms is multiplied by the 70 MHz IF signal $PN \cdot \cos((w+\Delta w)t+\phi)$ in respective multipliers 47 and 48. The output of multiplier 47 is passed through lowpass filter 49 to obtain the I signal $0.5 \cdot PN \cdot \cos(\Delta wt + \phi)$, and the output of multiplier 48 is passed through lowpass filter 50 to obtain the Q signal $-0.5 \cdot PN \cdot \sin(\Delta wt + \phi)$. The signals emerging from the lowpass filters are orthogonal to each other, and the carrier component of frequency w has been removed. However, the Doppler shift remains.

Next, the I and Q signals from the outputs of the lowpass filters 49 and 50 are digitized by respective A/D converters 38 and 39. The two digitized signals are stored in RAM memory 15 for a predetermined time, and they will later be transmitted to the Doppler Correcting Portion 16.

The previously-mentioned High-Frequency Amplifying Portion 32, the Frequency Transforming Portion 33, the Local Oscillator Portion 34, the I Signal Transforming Portion 35, the Q Signal Transforming Portion 36, the 90-degree phase shifter 37, and the A/D converters 38 and 39 are general-purpose and widely used. Therefore, more detailed and concrete descriptions of these portions are omitted.

Although in the described embodiment of the current invention the signals emerging from lowpass filters 49 and 50 have the carrier component removed, it is understood that in an alternate embodiment a carrier component can remain. In this case the waveforms $\cos(wt)$ and $\sin(wt)$ entering multipliers 47 and 48 can be replaced by $\cos(w_1 t)$ and $\sin(w_1 t)$, where $w_1$ is a frequency different from the IF frequency w. Furthermore, in this case bandpass filters can be used instead of the lowpass filters 49 and 50.

The I and Q digitized signals that have been stored in RAM 15 contain the additively combined signals from all satellites, which are embedded in noise. Each signal still has apparent Doppler shift produced by satellite motion and the frequency error in the Local Oscillator Portion 36. In order to detect a satellite signal, each of the plurality of candidate frequency values computed in Portion 51 of FIG. 2 must be tried as a Doppler compensation value for the signal in the Doppler Correcting Portion 16. For each trial frequency value a correlation is performed. The trial frequency value which produces the largest peak among all correlations will give a good estimate of the accurate local frequency error estimate of the apparent Doppler shift of the signal.

FIG. 5 is a block diagram showing the process of Doppler correction using the candidate frequency values, the subsequent correlations, the detection of the largest correlation peak, and the final calculation of accurate local frequency error. For purposes of clarity, the processing for a single satellite signal will be described.

For each of the candidate frequency values a Doppler correction of the digitized I and Q signals accessed from RAM 15 is performed. To permit rapid calculation it is preferable to perform these corrections in parallel using multiple units, as shown in FIG. 5. Each unit receives a correction frequency which is computed as the sum of the satellite signal Doppler shift received from the base station and one of the candidate frequency values of accurate local frequency error. Each correction frequency can be expressed in the form $\Delta w' = \Delta w_C + \Delta w_L'$, where $\Delta w_C$ is the base station's measurement of satellite signal Doppler shift and $\Delta W_L$ is the candidate frequency value for accurate local frequency error. The correction frequencies in FIG. 5 are denoted by $F_X$.

Figure 7:
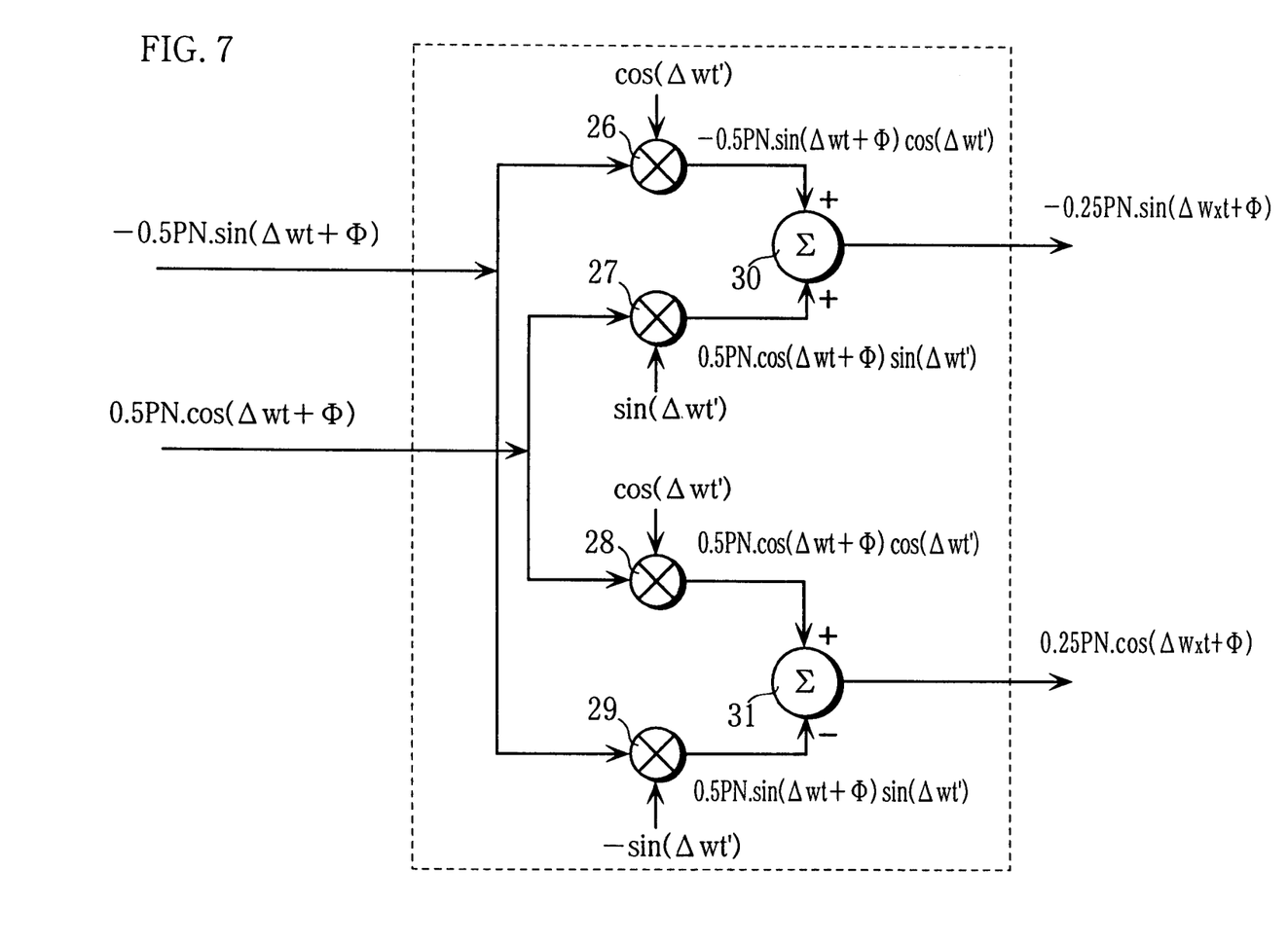
FIG. 7 is an explanatory diagram showing how the Doppler correction of the I-Q signal is performed.

FIG. 7 shows in detail how the Doppler correction is performed for a specific candidate frequency value of correction. The Doppler correction uses multipliers 26, 27, 28, and 29, an adder 30, and a subtracter 31. The I and Q input signals at the left of the figure are the digital baseband signals previously stored in RAM 15 as described previously. These input signals are respectively denoted by $0.5 \cdot PN \cdot \cos(\Delta wt + \phi)$ and $-0.5 \cdot PN \cdot \sin(\Delta wt + \phi)$, where the time t is discretized (i.e., the values of t are sampling time points).

The input signals are each multiplied by the two sampled waveforms $\cos(\Delta w't)$ and $\sin(\Delta w't)$ in the multipliers 26, 27, 28, and 29, and the multiplier outputs are processed through adder 30 and subtracter 31 as shown in FIG. 7. to obtain the signals. The output of adder 30 is $-0.25 \cdot PN \cdot \sin(\Delta w_X t + \phi)$ and the output of subtracter 31 is 0.25·PN·cos($\Delta w_x t+\phi$), where $\Delta w_x$ is the difference between the input frequency $\Delta w$ and the candidate frequency $\Delta w'$. Therefore, the accurate local frequency error can be determined by finding the candidate frequency value $\Delta w'$ which makes $\Delta w_x$ a close approximation to zero. This process will now be described.

The operations shown in FIG. 7 constitute the processing within each unit of the Doppler Correction Portion 16, with one unit for each candidate frequency value. Each unit produces two outputs having the forms −0.25·PN·sin($\Delta w_x t+\phi$) and 0.25·PN·cos($\Delta w_x t+\phi$), which can be considered as a single complex-valued signal. The complex signal from each unit is input to a correlator which serves that unit. The bank of correlators serving all units is located in the Correlation Calculation Portion 9 (refer to FIG. 4). In each correlator the complex input signal is correlated with a replica PN code generated within the receiver terminal 11 to produce a correlation function whose peak value and the delay giving the peak value is calculated.

Although the correlation calculation is generally known, it is simply described as follows: As the GPS satellites A orbit around the earth, each transmits an RF carrier signal at 1575.42 MHz which is biphase modulated with a 1023-chip PN code called the C/A code. The C/A code modulation causes the spectrum of the signal to have a large bandwidth (approximately +/−1 MHz). For this reason the signal is called a spread-spectrum signal. Each satellite uses a unique C/A code. For example, satellite $A_1$ uses PN code a and satellite $A_2$ uses a different PN code b. The use of different codes has several purposes. First, it permits separation of the signals from satellites $A_1$ and $A_2$, even though the satellites transmit on the same frequency. Second, the wide bandwidth of the signals permits GPS receivers to accurately measure signal arrival delay. Third, the codes provide some immunity to interference and jamming. All three of these goals require that the received signal be correlated against a replica code stored or generated within the receiver terminal 11. In the present invention the codes are stored. To receive satellite $A_1$, its code a must be stored in receiver terminal 11, to receive satellite $A_2$, code b must also be stored, and so on.

Each of the replica PN codes, corresponding to each of the GPS satellites A, is stored in ROM 46 of the Signal Processing Portion 21 within receiver terminal 11 (see FIG. 2).

Although it is generally known that the speed of the correlation calculation can be increased by using an FFT-based implementation, the ordinary calculation method is shown here to explain the principle. The correlation calculation is expressed by the formula $$Y(k)=\Sigma X(n)h(n+k), k=0, 1, 2, \ldots, N-1.$$

The index of summation is the integer n, which ranges from n=0 to n=N−1, N being the number of samples in the received signal. Y(k) is the correlation output for delay k, X(n) is the $n^{th}$ sample of signal data containing the received PN code, and h(n+k) is the $(n+k)^{th}$ sample of the replica code stored in the receiver. When the delay k is such that the replica PN code and the received PN code are aligned, Y(k) tends to have a larger value than for other values of k. Under these conditions the sampled chips of the received code combine to produce a value N times larger than the magnitude of a single chip. On the other hand, the noise component of X(n) is typically zero-mean Gaussian and uncorrelated from sample to sample. As a result, the noise samples combine in the summation to produce a random value with standard deviation only $\sqrt{N}$ times larger than that of a single sample. Thus, the noise relative to the signal is reduced by the factor $1/\sqrt{N}$.

Figure 8:
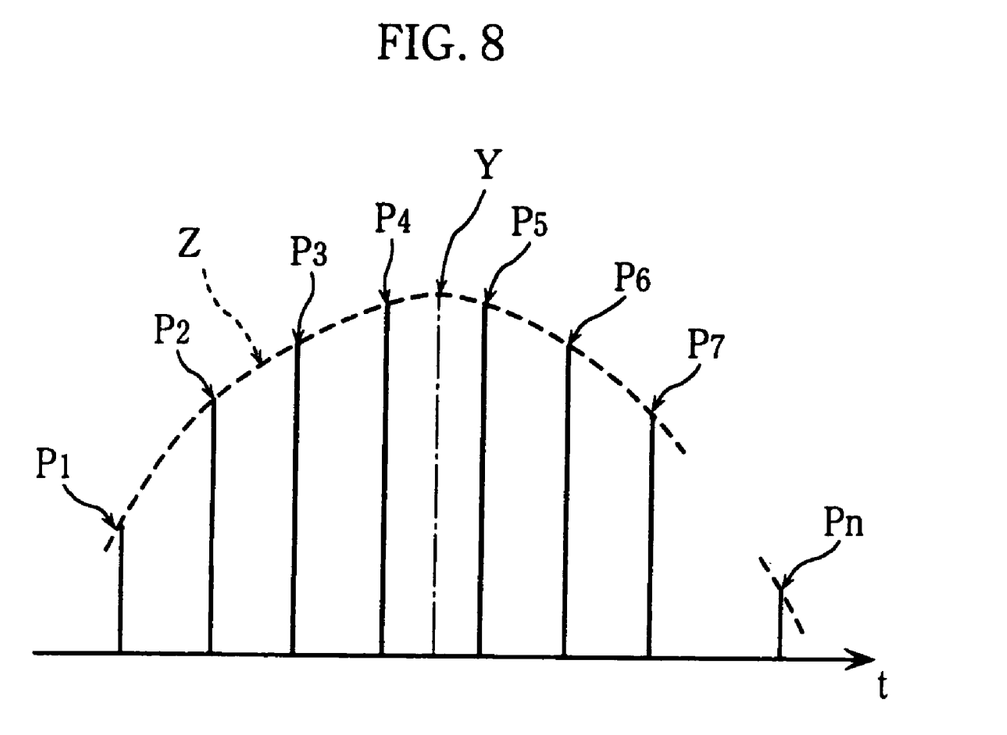
FIG. 8 is a graph showing how the peak value of a correlation function is accurately located.

FIG. 8 shows how the accurate local oscillator frequency error can be determined, which occurs in the Second Detecting Portion 7 of FIG. 1. As explained earlier, the peak correlation output value and its associated delay k are computed from the correlation function associated with each candidate frequency value of the accurate local oscillator frequency error. The peak correlation values $P_1, P_2, \ldots, P_n$ corresponding to the various candidate frequency values are shown in FIG. 8 by the height of n vertical lines (n is the number of candidate frequency values). The local frequency error can simply be the candidate frequency value associated with the largest of all the peak values. For example, if the largest peak is $P_4$, then the $4^{th}$ candidate frequency value is selected as the local frequency error. Alternatively, a more accurate estimate can be obtained by using an interpolation curve (curve Z in FIG. 8) which is fit to the points $P_1, P_2, \ldots, P_n$. In this case the horizontal position of the highest point Y on the interpolation curve is used to obtain the estimate. For example, if Y is halfway between peaks $P_4$ and $P_5$, the local frequency error is taken to be halfway between the $4^{th}$ and $5^{th}$ candidate frequency values.

The signal delay $\tau$ is also determined within Detecting Portion 19 of FIG. 1. There are several methods that can be used to compute $\tau$. The simplest is to use the delay k associated with the largest of the correlation peaks $P_1, P_2, \ldots, P_n$. Greater accuracy is possible by interpolation techniques, assuming that correlation values near the largest peak have been previously recorded. For example, if the largest correlation peak is $P_4$ located at delay k, an interpolating curve can be fit to $P_4$ and its nearest correlator outputs for delays k−1 and k+1. The horizontal position of the highest point on the interpolating curve can then be used to estimate the delay $\tau$ needed to compute the pseudorange.

The signal delay $\tau$ is sent to the Pseudorange Detecting Portion 19 (see FIG. 1) where it is used to compute a pseudorange to each satellite. Generally practiced means can be used to obtain the pseudorange, so an explanation of the pseudorange calculation is omitted.

The Position Calculating Portion 20 in FIG. 1 then calculates the position of the receiver terminal 11 by using the position of the base station 1, the pseudoranges between the base station 1 and the satellites A, and the pseudoranges calculated by the Pseudorange Detecting Portion 19. The first two of these three pieces of information have been transmitted from the base station 1 to the receiver terminal 11. The calculated position using this information is generally very accurate because differential methods of positioning, generally and widely known, can be employed.

Referring to FIG. 2, the Digital Signal Processing Portion 21 is composed of a CPU 42 connected to the Receiving Portion 12 to process the data obtained from it, a random-access memory (RAM) 45 and a read-only memory (ROM) 46 connected to the CPU 42, a Digital Signal Processing (DSP) Portion 41 connected to RAM memory 15, to ROM memory 44, to CPU 42, and to a Pattern Calculating Portion 22.

The Pattern Calculating Portion 22 generates and stores in memory the internal PN code chip patterns, i.e., the replica codes, for the satellites A needed for the correlations calculated in the Correlation Calculation Portion 9 shown in FIG. 1. The PN code chip patterns are fed to the DSP Portion 41 to perform the high-speed correlations. The CPU 42, DSP Portion 41, RAM 45, and ROM 46 function together as a microprocessor. ROM 46 primarily stores the working programs for digital signal processing. Such a composition of these components is widely used for general-purpose digital signal processing, so a detailed explanation of their operation is omitted.

Figure 9:
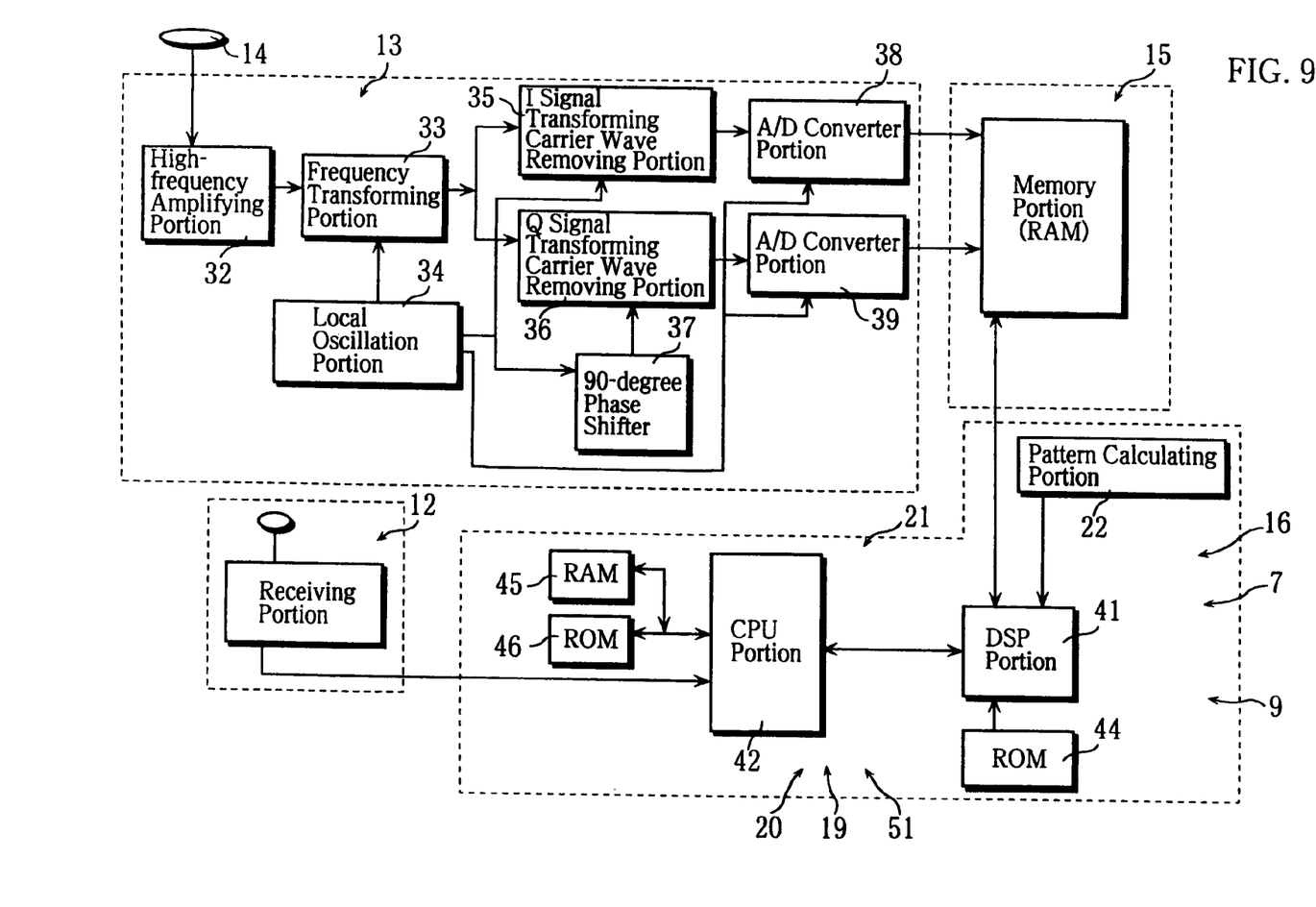
FIG. 9 is a block diagram showing the composition of the receiver terminal in a second embodiment.

A second embodiment of the present invention is shown in FIG. 9, which shows another structure for receiver terminal 11. This structure is similar in many respects to the structure of the first embodiment shown in FIG. 2, except for the method of detecting the local oscillator frequency error. In this embodiment the Receiving Portion 12 still receives data from the base station. However, the external oscillator 17 and the First Detecting Portion 6 are not provided. Instead, the design frequency and frequency uncertainty of the crystal oscillator used as a reference in the Local Oscillation Portion 34 have been stored in ROM 46.

As a first step, from this information CPU 42 computes a range of frequency error of the crystal oscillator. For example, if the design frequency of the crystal oscillator is 16.368 MHz, its frequency uncertainty is 1 part per million, and its frequency has been multiplied by 100 to obtain the local oscillator frequency, then the computed range of frequency error is $\pm(16.368\times10^6)\times10^{-6}\times100=\pm1.6368$ kHz. For brevity, this range is called the error width.

Next, CPU 42 extends the error width to account for any remaining Doppler uncertainty in the signal received from a satellite (when Doppler information received from the base station 1 is used to reduce the Doppler uncertainty, the remaining uncertainty is generally due to the difference in location between receiver terminal 11 and the base station 1).

Then, a plurality of candidate frequency values lying within the error width are set by the Candidate Value Setting Portion 51. Referring to FIG. 1, these values are sent to the Doppler Correcting Portion 16 where the signals from the satellites A are Doppler-corrected. Subsequent processing is the same as in the first embodiment, namely, the Correlation Calculation Portion 9 and the Second Detecting Portion 7 work together to determine an accurate frequency error and signal delay $\tau$, and then the Pseudorange Detecting Portion 19 uses the delay $\tau$ to compute pseudorange to each satellite in the set of satellites A. From these pseudoranges the Position Calculation Portion 20 calculates the position of receiver terminal 11.

A third embodiment of the present invention is in all respects the same as the first embodiment, except that the oscillator 17 with frequency more accurate than the Local Oscillation Portion 34 is a portion of receiver terminal 11 itself instead of being externally located. This embodiment would be desirable if receiver terminal 11 were located within another device containing an oscillator with an accurate frequency not rationally related to the design frequency of the oscillator in Local Oscillation Portion 34. Examples of such a device include, but are not limited to, a cellular telephone or wireless communication unit.

Figure 10:
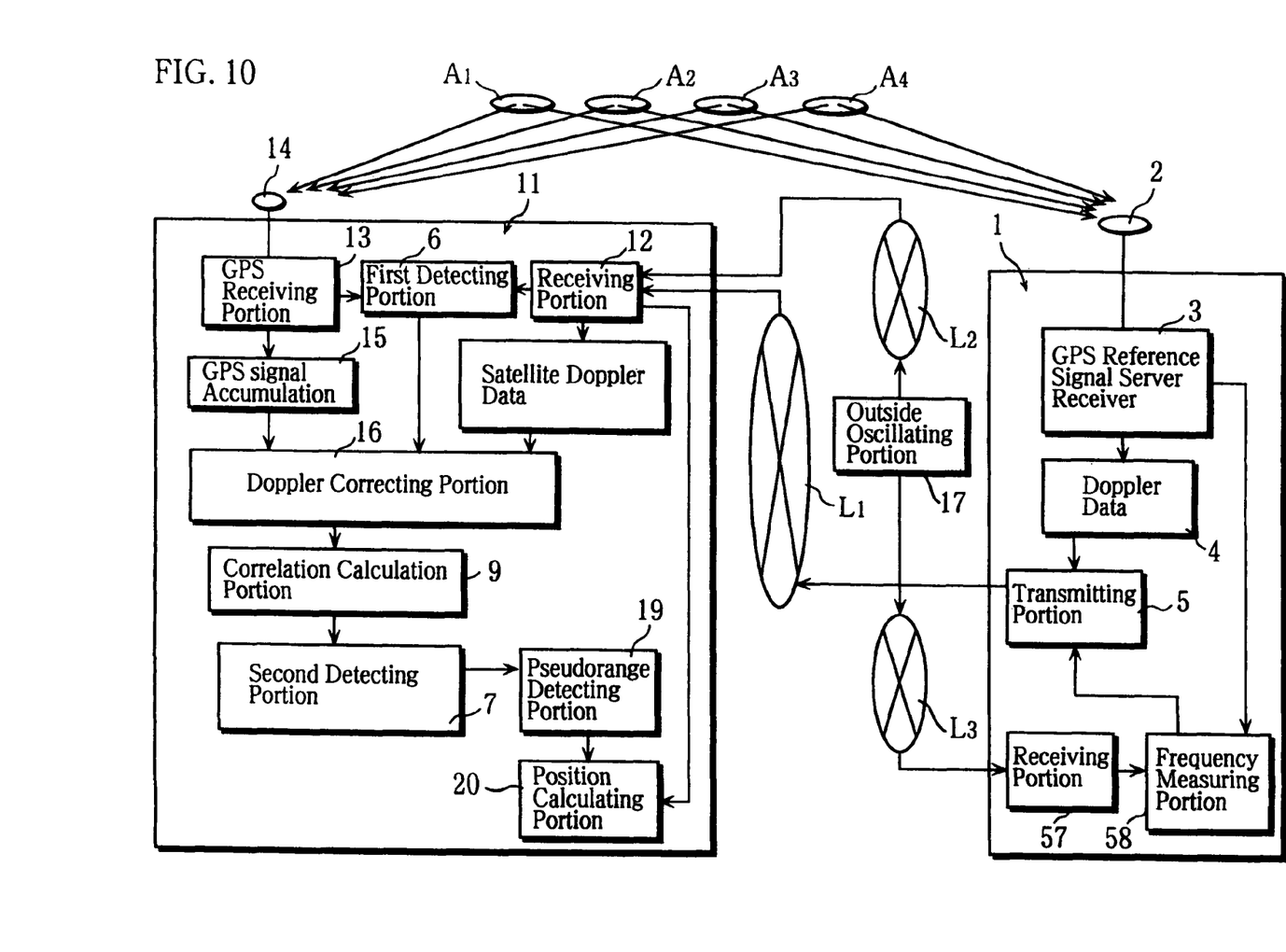
FIG. 10 is an overall block diagram showing an outline of a fourth embodiment of the present invention.

FIG. 10 illustrates a fourth embodiment of the present invention which in all respects is the same as the first embodiment, except that the external reference oscillator 17 is capable of transmitting its signal not only to receiver terminal 11, but also to base station 1. For example, external oscillator 17 could be an AM or FM radio broadcasting station, or a television broadcasting station. Receiving Portion 57 in the base station receives the signal from external oscillator 17 via communication link $L_3$ and the frequency of the signal is measured by Frequency Measuring Portion 58 using a frequency reference supplied by GPS Reference Signal Server Receiver 3. It is well known by those skilled in the art that GPS Reference Signal Server 3 can be designed to provide a very accurate reference frequency derived from its received GPS signals. Thus, the frequency of the external oscillator 17 can be very accurately measured. The measured frequency data from Frequency Measurement Portion 58 is sent to Transmitting Portion 5 which sends the data over link $L_1$ to receiver terminal 11, thus enabling receiver terminal 11 to know the frequency of external oscillator 17 with very great accuracy. As in the first embodiment, Receiving Portion 12 in receiver terminal 11 receives the signal from external oscillator 17 and can use it in exactly the same way as in the first embodiment. The advantage of this method is that "signals of opportunity" with arbitrary a-priori frequency uncertainty can still be used as high-quality frequency references when received by receiver terminal 11. Such signals, especially those used in AM/FM radio and television broadcasts, are usually quite numerous in urban areas and tend to have high power, making them easy to receive at both base station 1 and receiver terminal 11.

It will be understood by those skilled in the art that acquiring very weak GPS signals, such as those in urban canyons, heavy foliage, or indoors, usually requires a significantly longer processing time compared to that needed for outdoor locations having a clear view of the satellites. It will also be understood that the present invention provides a GPS measuring method, a GPS position measuring system, and a frequency error detecting method in which the long processing time needed to acquire very weak GPS signals can be made much shorter. It will also be clear to those skilled in the art that the present invention could have many variations which would not alter its basic nature, scope, and spirit.

What is claimed is:

1. A GPS measuring method in which a receiver terminal having a local oscillator portion receives a signal from a satellite and obtains pseudorange between the receiver terminal and the satellite, comprising a process in which the receiver terminal receives from an externally-located oscillator portion a frequency more accurate than that of the local oscillator portion, the local oscillator frequency is measured with reference to the frequency of the externally-located oscillator, thus determining the error of the local oscillator frequency, a plurality of candidate values for accurate local frequency error are set within a predetermined frequency range including the error of the local oscillator frequency, the signal from the satellite is processed by a bank of correlators using the combination of the Doppler data from a base station and the candidate values for local oscillator frequency error, the accurate frequency error and the signal delay value are detected from the result of the correlation calculations, and the pseudorange to the satellite is detected from the delay value.

2. A GPS measuring method in which a receiver terminal having a local oscillator portion receives a signal from a satellite and obtains pseudorange between the receiver terminal and the satellite, comprising a process in which the receiver terminal knows the design frequency and error range of the crystal oscillator used in its local oscillator portion, and from this knowledge calculates a range of local frequency error which includes the actual but as yet unknown local frequency error, a plurality of candidate values for accurate local frequency error are set within this range, Doppler correction of the satellite signal is conducted using the combination of the Doppler data from a base station and the candidate values for accurate local oscillator frequency error, correlation calculations are performed on the Doppler-corrected signals, accurate local frequency error and signal delay value are computed from the correlation results, and pseudorange between the receiver terminal and the satellite is obtained from the delay value.

3. A frequency error detecting method comprising a process in which a receiver terminal receives from an externally-located oscillator portion a frequency more accurate than that of a local oscillator portion, the frequency of the local oscillator is measured with reference to the externally-located oscillator frequency, thus determining the error of the local oscillator frequency, a plurality of candidate values for accurate local frequency error are set within a predetermined frequency range including the error of the local oscillator frequency, the signal from a satellite is processed by a bank of correlators using the combination of the Doppler data from a base station and the candidate values for local oscillator frequency error, and the accurate frequency error is detected from the results of the correlation calculations.

* * * * *